March 4, 1952 O. W. GITHENS ET AL 2,587,723
GUN PERFORATOR
Filed May 18, 1949 5 Sheets-Sheet 1

INVENTORS
Otto W. Githens
Thad W. Smith
David C. Whitaker (Deceased)
by Dorothy B. Whitaker, administratrix
by Donald J. Marcus
attorney March 4, 1952     O. W. GITHENS ET AL     2,587,723
GUN PERFORATOR
Filed May 18, 1949     5 Sheets-Sheet 2
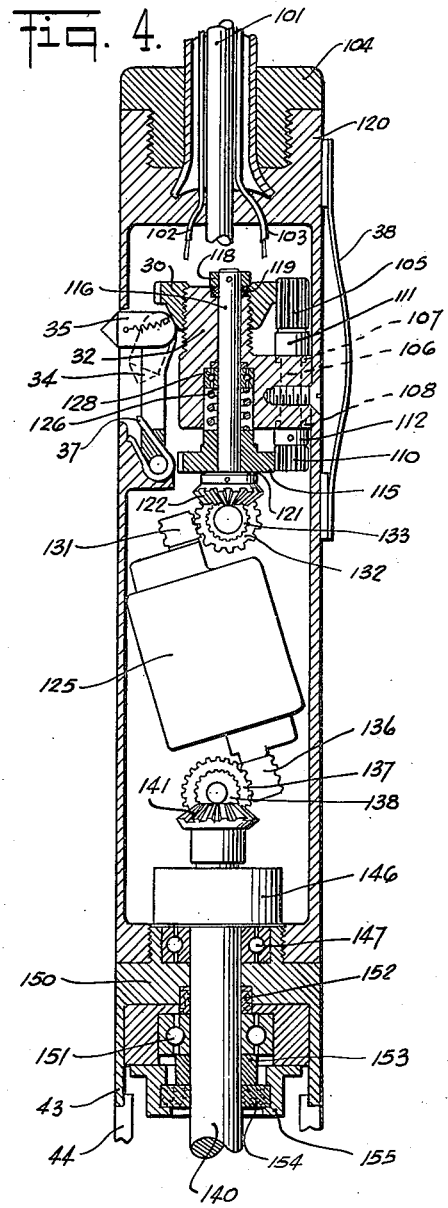
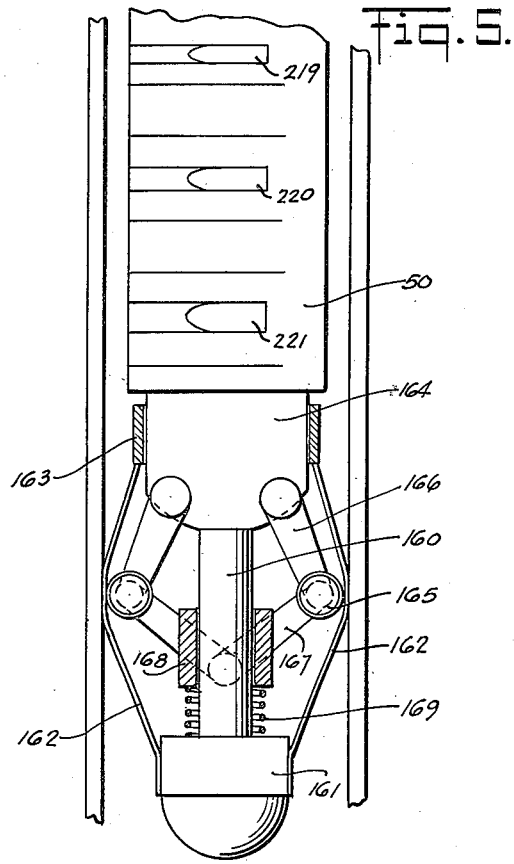
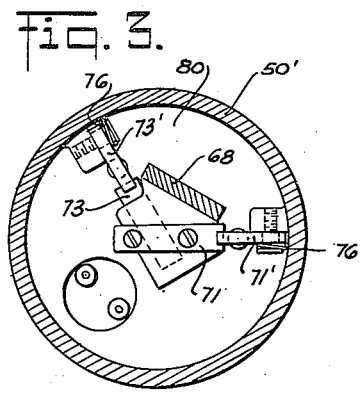
INVENTORS

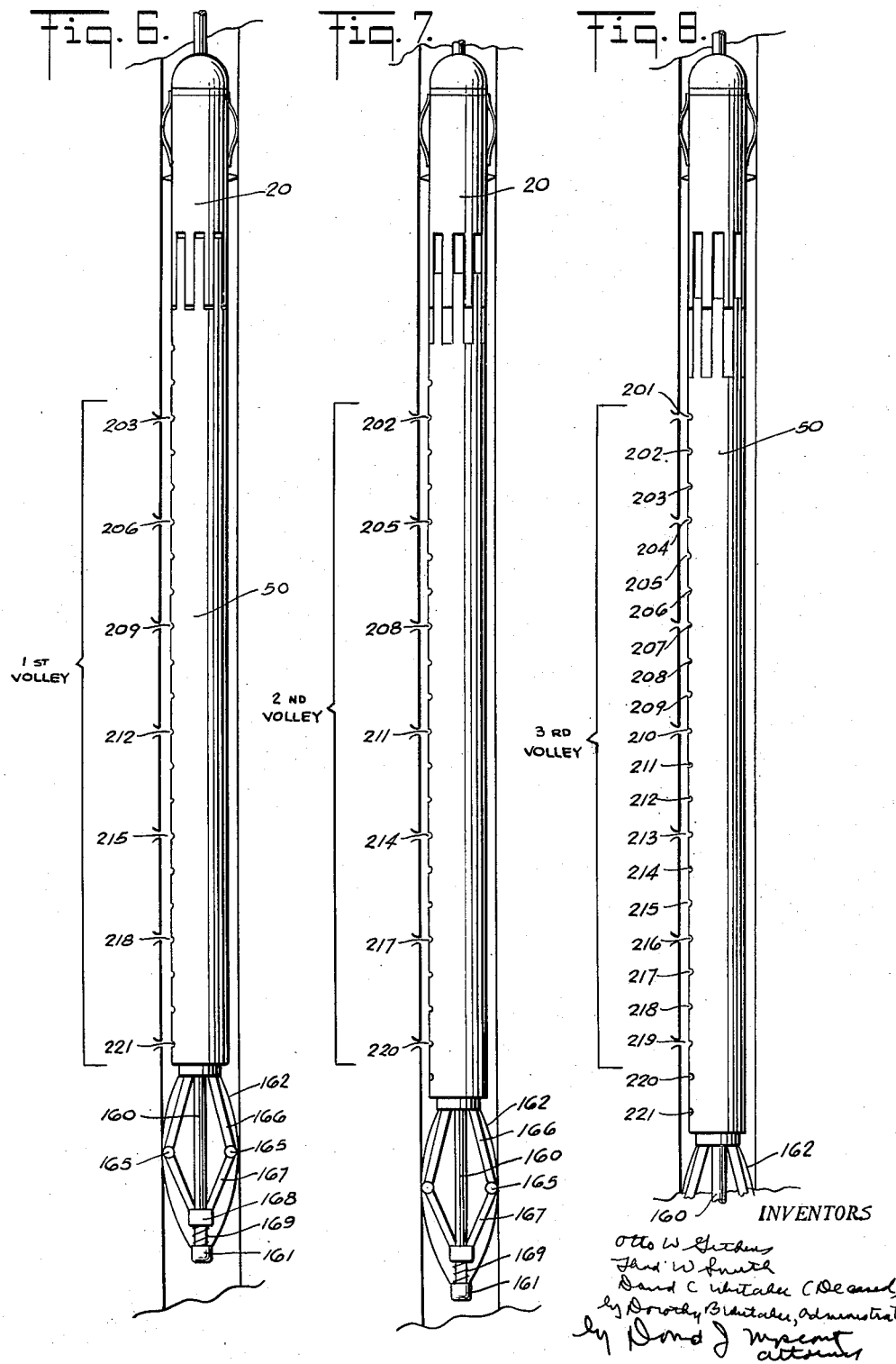

March 4, 1952 O. W. GITHENS ET AL 2,587,723
GUN PERFORATOR
Filed May 18, 1949 5 Sheets-Sheet 4
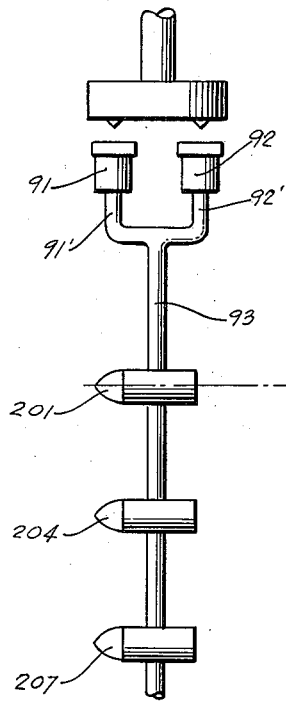
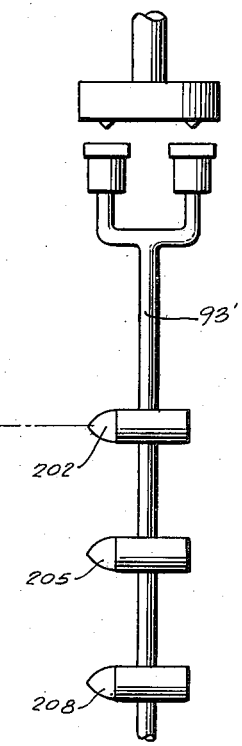
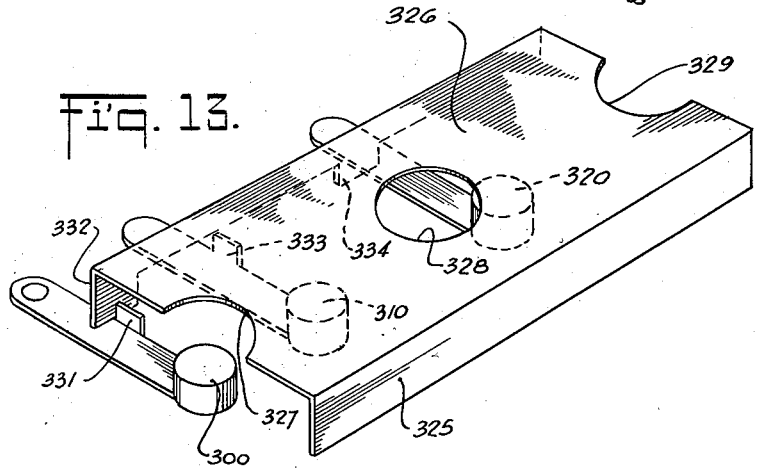
INVENTORS

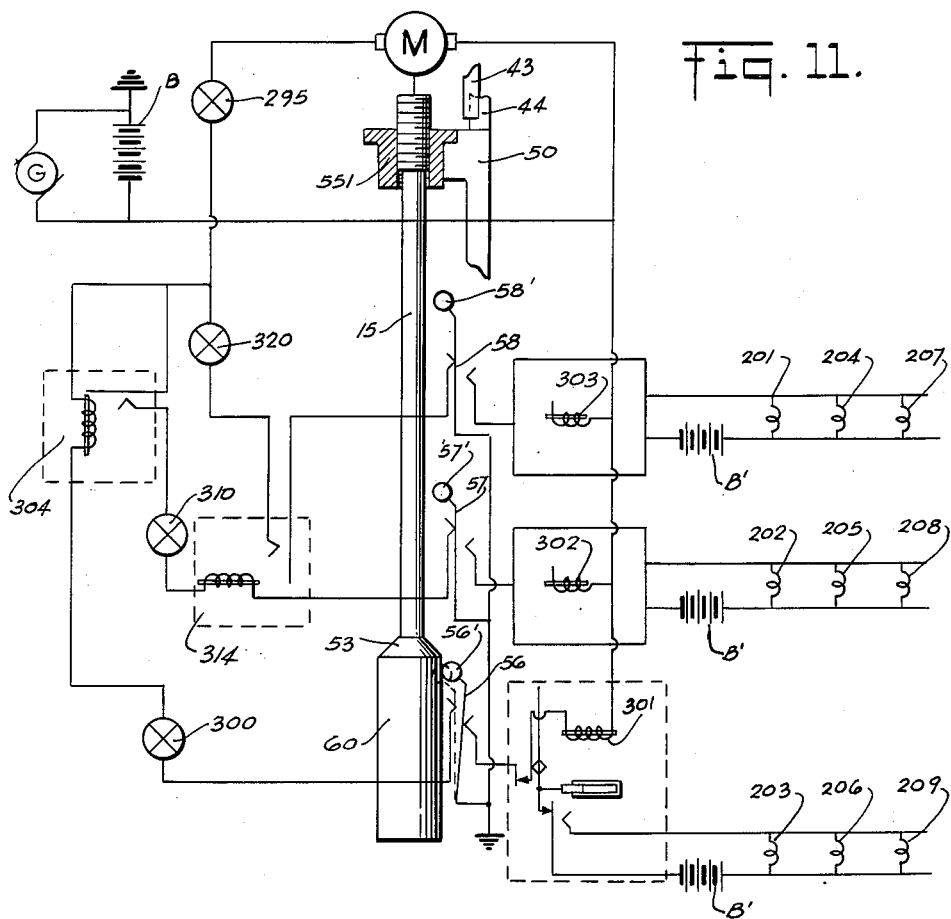
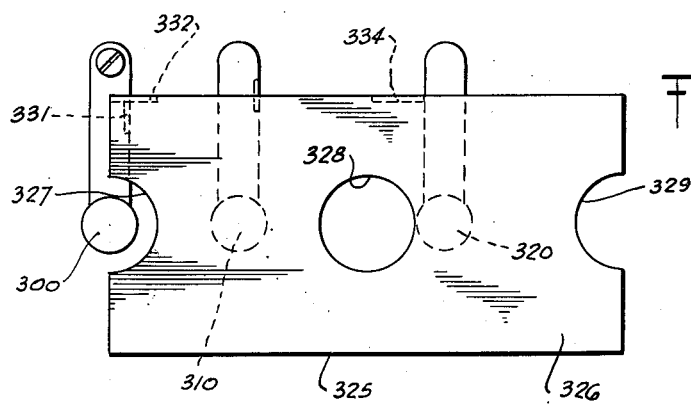

Patented Mar. 4, 1952

2,587,723

UNITED STATES PATENT OFFICE 2,587,723

GUN PERFORATOR

Otto W. Githens, New York, N. Y., Thad W. Smith, Houston, Tex., and David C. Whitaker, deceased, late of Houston, Tex., by Dorothy B. Whitaker, administratrix, Great Barrington, Mass.

Application May 18, 1949, Serial No. 93,928

7 Claims. (Cl. 164—0.5)

This invention relates to gun perforators such as used for forcing holes through the sides of oil well casing into the surrounding earth strata for the purpose of making fissures therein to permit oil to flow back into the casing and, more particularly, to a device of this character in which a series of projectile charges are successively fired through the same hole or holes in the casing in order to obtain maximum penetration in the earth strata.

In the drilling of oil wells, it is customary to line the drilled hole, in stages, with a steel casing. This casing is inserted in successive sections as the drilling progresses in depth, and concrete is pumped down the casing to exude upward around said casing to firmly hold the same in place in the well. After the casing has been installed, it is necessary to provide means for oil to enter the casing from the surrounding earth strata.

For the latter purpose, devices called gun perforators are used to force holes through the casing and into the surrounding earth. These gun perforators are arranged to discharge projectiles radially through the casing in one or more directions, and create fissures in the surrounding strata through which any oil present may find a path to flow back into the casing. As heretofore used, these gun perforators have had limitations as to the effective penetration range, and it has been difficult, if not impossible, to create fissures for more than a short distance around the general area of the drilled hole. Such limitations have been due to the fact that the projectiles, whether of the cartridge type or of the selfpropelled type, have been limited in size and in the amount and/or power of the propellent.

The present invention relates to an improved perforator in which series of projectiles are discharged through the same holes in the casing. Thereby, each succeeding projectile has less initial resistance to its movement and will consequently penetrate to a greater distance than the preceding projectiles.

A feature of the invention is the provision of novel indexing means for successively aligning projectiles with the first hole or series of holes forced through the casing. Projectiles may be discharged singly, or preferably, are discharged in groups, with the different projectiles of each group being aligned in the same radial or axial plane.

After each charge, the gun perforator is automatically indexed so that another group of projectiles is aligned to discharge in the same plane as the first group. The improved gun perforator of the invention is equally adaptable for use for electric firing of projectiles or with mechanical firing of projectiles and the same indexing mechanism may be used with either type of firing.

With the foregoing in mind, it is an object of this invention to provide an improved gun perforator, particularly adapted for use in perforating oil well casing.

Another object is the provision of a casing perforator having novel indexing means whereby successive projectiles may be fired through identical holes in the casing to obtain increased radius of penetration into the surrounding earth strata.

A further object of the invention is the provision of such a perforator in which the indexing means may be used with either electrical or mechanical firing of projectiles.

These and other objects, advantages and novel features of the invention will be apparent from the following description and the accompanying drawings. In the drawings:

Fig. 3 is a diametric sectional view on the line 3—3 of Fig. 2;

Fig. 4 is an axial sectional view through the head housing of a further embodiment of the invention;

Fig. 5 is an elevation view, partly in section, of the lower end of the perforating gun body showing means for centering the same within the oil well casing;

Figs. 6, 7 and 8 are reduced scale views of the gun in elevation and the well casing in section, showing the firing of successive series of projectiles through the same hole in the casing;

Figs. 9 and 10 are schematic views illustrating firing arrangements associated with the embodiment of the invention shown in Fig. 2;

Fig. 11 is a schematic wiring diagram showing a control circuit for the indexing mechanism and associated electrical firing mechanism;

Fig. 12 is a plan view of a push button interlocking arrangement for controlling the electrical firing; and Fig. 13 is a perspective view of the push button interlocking arrangement.

Generally speaking, the gun perforator of the invention includes a fluid sealed head housing containing an indexing drive mechanism and connected at its lower end to a perforating gun body which contains the several series of projectiles and indexing means for aligning each series in the same plane as the initial series before firing of the succeeding series. Means are provided for accurately centering the assembly within the oil well casing and preferably concentric therewith. Automatic actuable means are likewise provided for locking the assembly in fixed vertical position in the casing before the firing is initiated.

The indexing mechanism operates to move the gun body relatively to the head housing to achieve the successive indexing of the projectiles. This is accomplished by making provision for vertical and/or rotary adjustment of the gun body relative to the head housing. While either type of adjustment may be used and both are within the purview of the invention, the drawings, by way of illustrative example, only illustrate a vertical adjustment. The entire assembly is suspended in the well casing by mounting on tubing or the drill pipe or the assembly may be suspended on a flexible cable.

Figure 1:
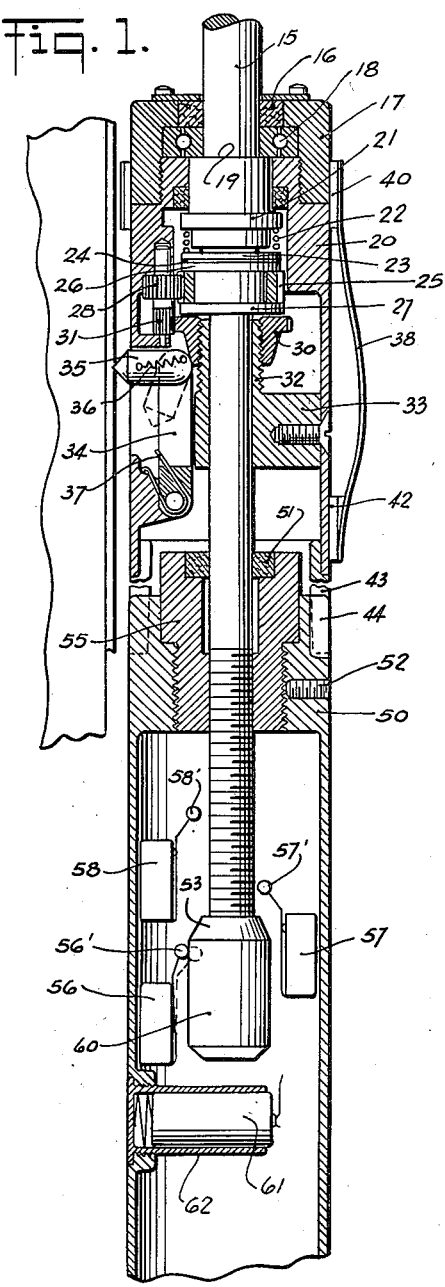
Fig. 1 is an axial sectional view through the head housing and the upper portion of the gun body of one embodiment which the invention may assume in practice.
Figure 2:
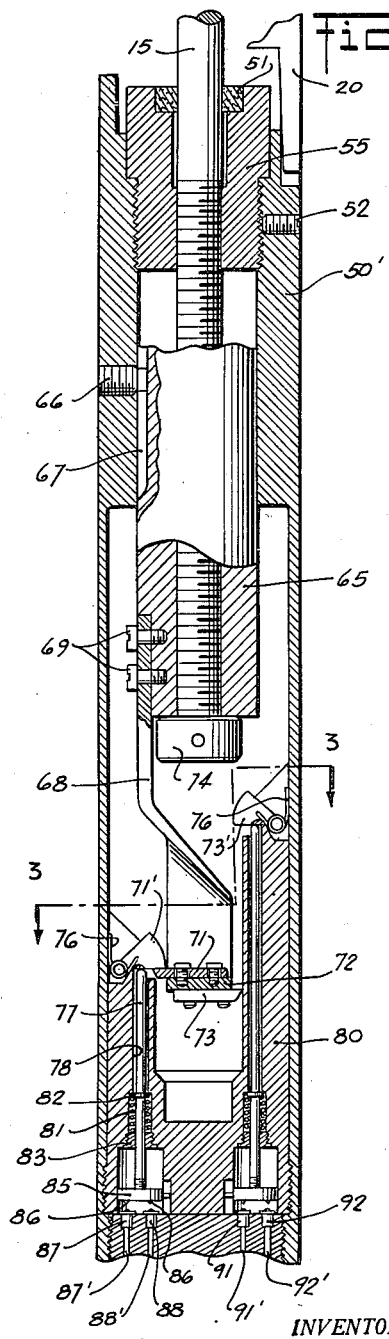
Fig. 2 is a view similar to Fig. 1 of another embodiment of the invention.

Referring first to Fig. 1 of the drawings, the gun perforator assembly includes a shaft 15 which is suitably connected to the drill pipe or tubing extending to apparatus on the exterior of the well, viz. derrick floor. Shaft 15 extends through a fluid seal 16 into a head housing 20. Housing 20 has a cap 17 secured thereto and containing a thrust bearing 18 operatively engaging shaft 15, the shaft having collar 19 thereon formed to cooperate with bearing 18 to support the weight of the gun assembly. The fluid seal 16 prevents entry of well fluid, such as water, oil, drilling mud, or the like, entering the assembly.

A second shoulder 21 on shaft 15 engages an axial thrust coil spring 22 bearing against a thrust disc 23 rotatable with shaft 15. Disc 23 bears against a friction ring 24 which engages a thrust surface 26 on a gear 25. The latter is free to rotate relative to shaft 15 and is held in proper axial position by collar 27.

Gear 25 meshes with a pinion 28 rotatably mounted in head housing 20 and having a splined extension 31 which meshes with the gear teeth of a coneshaped member 30. The latter is threaded on an extension 32 of a member 33 fixed with respect to head housing 20.

Cone member 30 is arranged to operate a plurality (3) of dogs 35, each of which is mounted in a forked member 34 pivotally mounted in housing 20 for swinging movements in a horizontal plane. The dogs 35 are swingably mounted in the outer ends of members 34, and springs 36 act to maintain the dogs in either a retracted or a radially projected position. Springs 37 bias members 34 inwardly, and these members may be forced outwardly by a downward movement of cone member 30 on extension 32. The head housing also carries spring bands 38 which are bowed outwardly and secured to upper and lower collars 40, 42, either or both of which are fixed to the outer surface of the head housing. These spring bands operate to center the housing within the well casing, and the lower collar 42 may, if desired, be arranged to slide on the housing to compensate for any slight differences in internal diameter of the casing.

In the embodiment shown in the drawings, the lower end of housing 20 has a series of splines 43 engaging mating splines 44 on the upper end of gun body 50. Thereby, the gun body is constrained against rotation with respect to housing 20, but is axially or longitudinally movable relative thereto.

Shaft 15 passes into gun body 50 through a fluid seal 51, in the upper end of the gun body and is threaded to engage a nut 55 which is likewise threaded into gun body 50 and held against rotation by a set screw dog 52. Within gun body 50, the lower end of shaft 15 carries a cylindrical cam 60 having an upper conical shoulder 53. Cam 60 constitutes the indexing means for sequentially firing the several series of projectiles through holes in the same plane in the casing.

By way of example, Fig. 1 illustrates an electrical firing system associated with the indexing mechanism. As shown, a series of switches 56, 57, 58 are secured on the interior of gun body 50 with their operating elements 56', 57' and 58' disposed at predetermined distances apart in an axial direction. Each of these switches controls the firing of a series of projectiles with each series having all the projectiles thereof in the same diametric plane. For this purpose, a suitable source of electric energy, shown as a battery 61, is mounted in a holder 62 disposed within the gun body 50. While one battery is shown, a series of batteries may be used, or outside power may be supplied through conductors led down through housing 20 and into the gun body 50. The operation of the indexing mechanism will be described more fully hereinafter. Briefly, however, as each series of projectiles is fired, gun body 50 moves downwardly relative to shaft 15 and cam 60 so that the conical shoulder 53 engages in succession, the operating elements of the several switches. These elements are so axially spaced that they will be operated at the instant a succeeding series of projectiles is aligned with the holes perforated by the first-fired series of projectiles.

Figs. 2, 3, 9 and 10 illustrate an indexing arrangement for mechanically firing the several series of projectiles. The same housing 20 is used and the upper end of gun body 50' has the same internal arrangement and cooperation with shaft 15 as in Fig. 1. A second nut 65 is threaded on the lower end of shaft 15 and prevented from rotation relative to gun body 50' by a key 66 engaging an elongated slot 67 in the outer surface of nut 65. The lower end of nut 65 has secured thereto an arm or bracket 68, by means of studs 69, and this bracket carries, at its lower end, a plurality of hammer tripping sears 71, 72 and 73. The extreme lower end of shaft 15 carries a nut 74 which acts as an end stop for nut 65.

The firing mechanism includes hammers such as 71' and 73' which are biased by spring 76, 76 to a downward position. Hammer 71' cooperates with a firing pin 77 extending through a bore 78 in a firing member 80 mounted in gun body 50'. A spring 81 biases pin 77 to an upper position, through engagement between a shoulder 82 and a collar 83. On the lower end of pin 77 is a firing pin head 85 formed with pins 86, 86 aligned with blank cartridges 87, 88, each associated with a bore or flash tube 87', 88'. A similar arrangement is associated with hammer 73' which is arranged to effect firing of cartridges 91, 92 discharging into bores or flash tubes 91', 92'. Flash tubes 87', 88' join to form a single passage 93' extending downwardly through the gun body, and passages 91', 92' join to form a single passage 93 likewise extending downwardly through the gun body.

As gun body 50' moves downwardly, bracket 68 moves upwardly, in a relative direction, with respect to the gun body. The several sears are angularly spaced, and the several firing hammers are likewise angularly spaced. In the firing operation, sear 71 first engages hammer 71' and swings this counter-clockwise until the hammer is free to move downwardly under the force of spring 76, past the sear 71. This sharp downward movement effects a hammer blow against pin 77 which causes firing head 85 to fire cartridges 87 and 88 downwardly into passage 89. As will be explained hereinafter, this effects the firing of a series of projectiles arranged in the same radial plane and having their firing chambers connected to passage 93'. As the gun body moves downwardly into the next indexed position, the second sear 72 fires its blank cartridges, and in the succeeding position sear 73 trips hammer 73' to fire cartridges 91, 92 into flash tube 93. This sequence of operation will be explained more fully in connection with the description of Figs. 6, 7 and 8.

Fig. 4 shows an alternative arrangement for indexing the gun body with respect to the head housing. In this arrangement, the assembly is supported on a cable 101 to which are secured electric conductors such as 102, 103. Cable 101 is suitably anchored into the cap 104 of head housing 120. If desired, a single insulated conductor could be used, and the casing could be grounded through the centralizing spring bands 38 which are the same as in Fig. 1. All such conductors, together with the supporting cables, may be sheathed in a common flexible tubing. The cone member 30 and the co-acting dogs 35 mounted in forked members 34 are the same as described in connection with Fig. 1.

In this embodiment, the cone member 30 meshes with a pinion 105 on a shaft 106 extending through bracket 33. Fluid seals 107 and 108 are associated with shaft 106. On the lower end of shaft 106 is a second pinion 110, suitable collars 111 and 112 being provided to position the shaft with respect to bracket 33. Pinion 110 meshes with a gear 115 rotatable on a shaft 116 having an upper supporting collar 118 secured thereto and engaging extension 32. A coil spring 126 is compressed between the upper surface of gear 115 and the lower side of a thrust bearing 128. Shaft 116 is provided with a suitable fluid seal 119.

The lower face of gear 115 bears against a friction disc 121 which engages the upper or back surface of the hub of a bevel gear 122. Gear 122 is driven from a motor 125 through a worm 131, worm gear 132 and bevel gear 133.

The other end of the armature shaft of motor 125 carries a worm 136 engaging a worm gear 137 rotatable with a bevel gear 138. Bevel gear 138 meshes with a bevel gear 141 on the upper end of a shaft 140. Shaft 140 has a thrust collar 146 engaging a thrust bearing 147 located in a cap 150 of head 120. Shaft 140 corresponds to the lower portion of shaft 15 of Figs. 1 and 2 as disposed within the gun body 50 or 50' of those figures. The cap 150 carries a second thrust bearing 151 for shaft 140, and fluid seal 152, and associated therewith are a shaft aligning collar 153, an additional fluid seal 154 and a retainer member 155.

The lower end of the gun body is illustrated more particularly in Fig. 5, as having an extension shaft 160 terminating in a ring-shaped cap 161. A plurality of bowed spring bands 162 (3 in number) are secured at their lower ends to ring 161 and at their upper ends to a collar 163 which may be either fixed or slidably mounted on an extension 164 of the gun body.

Bearing on the inner surface of each band 162 is a roll 165 rotatably mounted in links 166 and 167. These links are respectively connected to extension 164 and a collar 168 embracing shaft 160 and biased upwardly by a spring 169 engaging ring cap 161. The described arrangement operates to center the gun body in a well casing.

Referring to Figs. 6, 7 and 8, the gun body carries a plurality of jet or gun barrels of conventional type. While the drawings show, for simplicity, the openings of only one set of gun barrels, it will be understood that each set comprises a plurality of gun barrels all mounted to fire in the same diametric plane. In Figs. 6, 7 and 8, the several successive sets of charges are numbered from 201 serially through 221, it being understood that the charges may be more or less in number and may be arranged to fire in as many directions as desired.

Fig. 6 shows the gun body 50 during the firing of the first series of charges 203, 206, 209, 212, 215, 218 and 221. After the first firing, the gun body is indexed to the second firing position wherein the charges 202, 205, 208, 211, 214, 217 and 220 are aligned with the holes perforated in the casing by the first-fired charges. After this second series of charges have been fired, the gun body is indexed to the third position in which charges 201, 204, 207, 210, 213, 216 and 219 are aligned with the previously perforated holes. This last series of charges is then fired. The first-fired charges perforate the casing, the surrounding concrete and penetrate some distance into the earth strata. The second-fired series of charges, following the same paths as the first-fired series, have less earth resistance and penetrate a greater distance into the surrounding formation. Correspondingly the third-fired series of charges increase the degree of penetration into the surrounding formation. The charges as shown in Fig. 5 are preferably of successively decreasing diameter, although we need not be limited to such variation.

The specific operation of the indexing mechanism is as follows, with reference being had first to the arrangement shown in Fig. 1. When the assembly has been run into the hole to the proper depth, the suspending pipe or tubing is caused to rotate effecting rotation of shaft 15 with respect to head 20. The latter is held against rotation by centralizing springs 38.

Shaft 15 rotates spring 22 and plate or disc 23 which drives gear 25 through friction disc 24, these latter elements acting as a friction clutch arrangement. Gear 25 drives pinion 28 to rotate cone member 30, which threads downwardly along extension 32 moving members 34 outwardly and moving dogs 35 to the radial position where they bite into the casing 100. When the dogs 35 are forced firmly into the casing, cone member 30 and its connected elements are locked against rotation, but do not effect the continuous rotation of the indexing shaft 15 of Fig. 1 or 140 of Fig. 4.

Through its engagement with nut 55, the shaft 15, in rotating, moves the gun body 50 downwardly. Consequently, cam 60 successively engages the operators of the switches 56, 57 and 58. As each switch is closed, its connected series of jet or cartridge type charges are fired. The closing of switch 56 fires the first set of charges to perforate the casing, the surrounding concrete, and create fissures in the formation. The firing of the successive series of charges is then through the same holes as formed by the firing of the first series of charges. After the desired number of volleys have been fired, upward force on the supporting pipe connected to shaft 15 causes dogs 35 to swing counter-clockwise, releasing their engagement with casing 100.

The operation of the indexing mechanism with reference to the mechanical firing is the same as that described in connection with Fig. 1. The sears 71, 72, 73 successively trip their corresponding hammers so that the gas pressure of the first blank cartridges, 87, 88, 91, 92, etc. are transferred through passages such as 93' and 93 to firing the charges such as 202, 205, etc. and 201, 204, etc. From Figs. 9 and 10, it will be noted that the charges of each series are spaced from the corresponding charges of a succeeding series by a uniform pitch distance $p$.

The electrically operated indexing mechanism shown in Fig. 4 operates in the following manner: Through closure of a switch, motor 125 is energized over conductors 102, 103, and drives pinion 110, shaft 106 and pinion 105 to thread cone member 30 downwardly on extension 32 to project dogs 35 to the casing-engaging position in the same manner as previously described.

Rotation of worm 136 through the connected gearing, rotates shaft 140. This shaft, as previously explained, operates to move the gun body to the successively indexed firing positions in the same manner as previously described, the coaction of shaft 140 with the firing controls being the same as the coaction of shaft 15 with the firing controls.

Fig. 11 shows a wiring control for use with the electrical firing mechanism. An operating motor M is illustrated as rotating shaft 15 threaded in nut 55 and carrying cam 60. The sloping surface 53 of cam 60 is shown as arranged to engage successively the contacts 56', 57' and 58' of firing switches 56, 57, 58 respectively. A source of current is illustrated as comprising a generator G in parallel circuit relation with a battery B. One source terminal is grounded and the other is connected to one side of motor M and to one terminal of each of a series of time delay relays 301, 302, 303. One time delay may be provided by pneumatic or hydraulic dash pots, or in any other convenient manner.

To ready the system for operation, master switch 295 is closed, after the gun has been lowered to the desired level. When the push button 300 for the first series of charges is depressed, current flows from the source through motor M, a self-latching relay 304, push button 300, and the normally closed elements of switch 56 to ground. Motor M is energized to rotate shaft 15, moving cam 60 longitudinally so that surface 53 strikes operator 56' and moves switch 56 to the position of Fig. 11.

Switch 56 closes the circuit of relay 301 before the motor circuit is opened. Relay 301 picks up with a delay just sufficient to provide for surface 53 to fully open the motor circuit to stop the cam reaction. As relay 301 closes its contacts, charges 203, 206, 209 are fired from a power source such as a battery B'.

Latch relay 304, when energized, closes the motor circuit as far as push button switch 310 for the second-fired series of charges. When switch 310 is operated, motor M is energized over a circuit including main switch 295, the closed contacts of latch relay 304, push button switch 310, latch relay 314, and the closed contacts of switch 57. When cam surface 53 strikes operator 57', the firing of the second series of charges 202, etc. is initiated in the same manner as for the first series of charges. Latch relay 314 closes a motor energizing circuit including the push button switch 320 for the third series of charges, and switch 58. As push button switch 320 is closed, the motor is again energized so that cam 60 strikes operator 58' to fire the charges 201, etc.

Referring to Figs. 12 and 13, an arrangement is illustrated whereby the three push buttons must be operated sequentially. These push buttons are associated with a generally inverted channel shaped member 325 which is longitudinally movable along the row of push buttons. The base 326 of member 325 contains finger apertures 327, 328 and 329. Before any firing occurs, button 300 is aligned with aperture 327. This button carries a stop 331 which engages an abutment 332 on member 325 so that the member may be moved only when button 300 is depressed. When the button is depressed, member 325 may be moved to the left until push button 310 is aligned with aperture 328. At this time, an abutment 333 engages a stop 334 on member 325 to lock the latter against further movement. Depression of button 310 releases the interlock so that member 325 may be moved to align button 320 with aperture 329. The arrangement thus assures a successive firing of the three series of charges, and may be extended to include as many series of charges as desired.

The described gun perforator provides for a greater penetration of the successively fired projectiles through the surrounding formation. This is accomplished without increase beyond normal in the propellent charges, or is proportionally increased beyond such increase. Each successive series of charges is fired through the holes formed in the casing and concrete by the first-fired series of charges, such being effected by the described indexing mechanism which successively aligns each series of charges in the same diametric plane as the first-fired series. The arrangement is equally well adapted to either mechanical or electric firing, and either embodiment of the indexing mechanism may be used with either firing arrangement.

While specific embodiments of the invention have been shown and described in detail to illustrate the application of the invention principle, it will be understood that the invention may be otherwise embodied without departing from such principles.

What is claimed is:

1. A gun perforator comprising, in combination, a supporting head member, a gun body member longitudinally aligned with said head member, a screw rotatable in one member and extending into the other member, a nut fixed to the other member and engaged with said screw, means operable to rotate said screw to effect relative longitudinal movement of said member, said gun body member having a plurality of projectile aiming means fixedly mounted therein in predetermined longitudinally spaced relation to each other along the path of such movement and movable longitudinally along such path as a result of such relative movement of said members, individual firing means each associated with an aiming means, said firing means being carried by said other member in longitudinally spaced relation along such path, the spacing corresponding to that of said aiming means, and a device carried by said screw and operable to successively operate said firing means as each associated aiming means is aligned with the same point along such path.

2. A gun perforator comprising, in combination, a supporting head member, a gun body member longitudinally aligned with said head member, a screw rotatable in one member and extending into the other member, a nut fixed to the other member and engaged with said screw, means operable to rotate said screw to effect relative longitudinal movement of said member, said gun body member having a plurality of projectile aiming means fixedly mounted therein in predetermined longitudinally spaced relation to each other along the path of such movement and movable longitudinally along such path as a result of such relative movement of said members, individual firing means each associated with an aiming means, said firing means being carried by said other member in longitudinally spaced relation along such path, the spacing corresponding to that of said aiming means, a device carried by said screw and operable to successively operate said firing means as each associated aiming means is aligned with the same point along such path, means operable by said screw to lock said one member against rotation, and a device carried by said screw and operable to successively operate said firing means as each associated aiming means is aligned with the same point along such path.

3. A gun perforator for oil well casing comprising, in combination, a substantially cylindrical supporting head member, a substantially cylindrical gun body member longitudinally aligned with said head member, a screw rotatable in one member and extending into the other member, a nut fixed to the other member and engaged with said screw, means operable to rotate said screw to effect relative longitudinal movement of said members, said gun body member having a plurality of groups of projectile aiming means, the aiming means of each group being radially directed and angularly spaced in the same diametric plane, and said groups being axially spaced a predetermined distance from each other along the path of such relative longitudinal movement, a plurality of firing means each associated with one of said groups of aiming means, said firing means being carried by one of said members in axially spaced relation along such path, the spacing corresponding to that of said groups of aiming means, and a device carried by said screw and operable to successively operate said firing means as each associated group of aiming means is aligned with the same point along such path.

4. A gun perforator for oil well casing comprising, in combination, a substantially cylindrical supporting head member, a substantially cylindrical gun body member longitudinally aligned with said head member, a screw rotatable in one member and extending into the other member, a nut fixed to the other member and engaged with said screw, means operable to rotate said screw to effect relative longitudinal movement of said members, said gun body member having a plurality of groups of projectile aiming means, the aiming means of each group being radially directed and angularly spaced in the same diametric plane, and said groups being axially spaced a predetermined distance from each other along the path of such relative longitudinal movement, a plurality of electrically operable firing means each associated with one of said groups of aiming means and each including a switch, said firing means being carried by one of said members in axially spaced relation along such path, the spacing corresponding to that of said groups of aiming means, and a cylindrical cam carried by said screw and operable to successively operate said switches to connect said firing means to a source of electric energy as each associated group of aiming means is aligned with the same point along such path.

5. A gun perforator as claimed in claim 4, in which said switches each include an operator disposed in the path of movement of said cam, and said firing means includes control switches each operable to fire one set of charges and interlocking means associated with said control switches and restraining the same for operation in a predetermined sequence.

6. A gun perforator as claimed in claim 4, in which said screw rotating means comprises an electric motor, and said firing means includes interlocked manually operable switches successively operable to energize said motor to move said cam to successive firing positions.

7. A gun perforator for oil well casing comprising, in combination, a substantially cylindrical supporting head member, a substantially cylindrical gun body member longitudinally aligned with said head member, a screw rotatable in one member and extending into the other member, a nut fixed to the other member and engaged with said screw, means operable to rotate said screw to effect relative longitudinal movement of said members, said gun body member having a plurality of groups of projectile aiming means, the aiming means of each group being radially directed and angularly spaced in the same diametric plane, and said groups being axially spaced a predetermined distance from each other along the path of such relative longitudinal movement, a plurality of firing means each associated with one of said groups of aiming means, said firing means being carried by one of said members in axially spaced relation along such path, the spacing corresponding to that of said groups of aiming means, each firing means including a firing hammer and said hammers being angularly spaced, and a plurality of trips carried by said screw and each longitudinally aligned with a hammer to successively trip said hammers as each associated group of aiming means is aligned with the same point along such path.

OTTO W. GITHENS.
THAD W. SMITH.
DOROTHY B. WHITAKER,
*Administratrix of the Estate of David C. Whitaker, Deceased.*

REFERENCES CITED

The following references are of record in the file of this patent:

UNITED STATES PATENTS

| Number | Name | Date |
|---|---|---|
| 2,142,572 | Metzner | Jan. 3, 1939 |